United States Patent
Scappatura

(10) Patent No.: US 6,240,725 B1
(45) Date of Patent: *Jun. 5, 2001

(54) INTERNAL COMBUSTION ENGINE EXHAUST TREATING APPARATUS AND METHOD

(76) Inventor: Dominic E. Scappatura, 604 Highway 654 West, Callander, Ontario (CA), P0H 1H0

( * ) Notice: Subject to any disclaimer, the term of this patent is extended or adjusted under 35 U.S.C. 154(b) by 0 days.

This patent is subject to a terminal disclaimer.

(21) Appl. No.: 09/478,477

(22) Filed: Jan. 6, 2000

(51) Int. Cl.$^7$ ..................................................... F01N 3/02
(52) U.S. Cl. .............................. 60/311; 60/274; 60/298; 60/309; 60/310
(58) Field of Search ................ 60/274, 297, 298, 60/309, 310, 311, 648; 95/67, 156; 502/232

(56) References Cited

U.S. PATENT DOCUMENTS

| | | | |
|---|---|---|---|
| 3,100,146 | * 8/1963 | Huntington | 95/67 |
| 3,782,115 | * 1/1974 | Johnson | 60/309 |
| 3,905,784 | * 9/1975 | Kelleher et al. | 95/156 |
| 3,968,649 | * 7/1976 | Edwards | 60/297 |
| 4,126,000 | * 11/1978 | Funk | 60/648 |
| 4,301,652 | * 11/1981 | Sohda et al. | 60/310 |
| 4,656,831 | * 4/1987 | Budininkas et al. | 60/297 |
| 4,870,045 | * 9/1989 | Gasper et al. | 502/232 |
| 5,300,265 | * 4/1994 | Banks et al. | 60/298 |
| 5,857,324 | * 1/1999 | Scappatura et al. | 60/298 |

* cited by examiner

Primary Examiner—Thomas Denion
Assistant Examiner—Tu M. Nguyen

(57) ABSTRACT

An apparatus and method for the removal of carbon particles (soot), odor, gas and particulate from the exhaust of a diesel engine. The method includes a carbon (soot) collector which collects the carbon (soot) and noxious odor which is connected to the catalytic converter of the engine, then enters a heat exchanger for cooling and condensing a major portion of the exhaust into a liquid condensate. The condensate enters a first reactor which neutralizes any acids present in the condensate and passes through an automatic drain into a holding tank. The non-condensed gases flow into a second reactor connected to a holding tank. Gases are reacted in the second chemical reactor with a substance which absorbs the carbon monoxide and nitrogen oxide. The two reactors remove a large quantity of nitrogen oxides and particulate matter. The treated gases then flow into a the soot bath for removal of minute carbon (soot) particles and thence into a vapor remover. The treated gases then are let out into the atmosphere through an exhaust outlet.

4 Claims, 6 Drawing Sheets

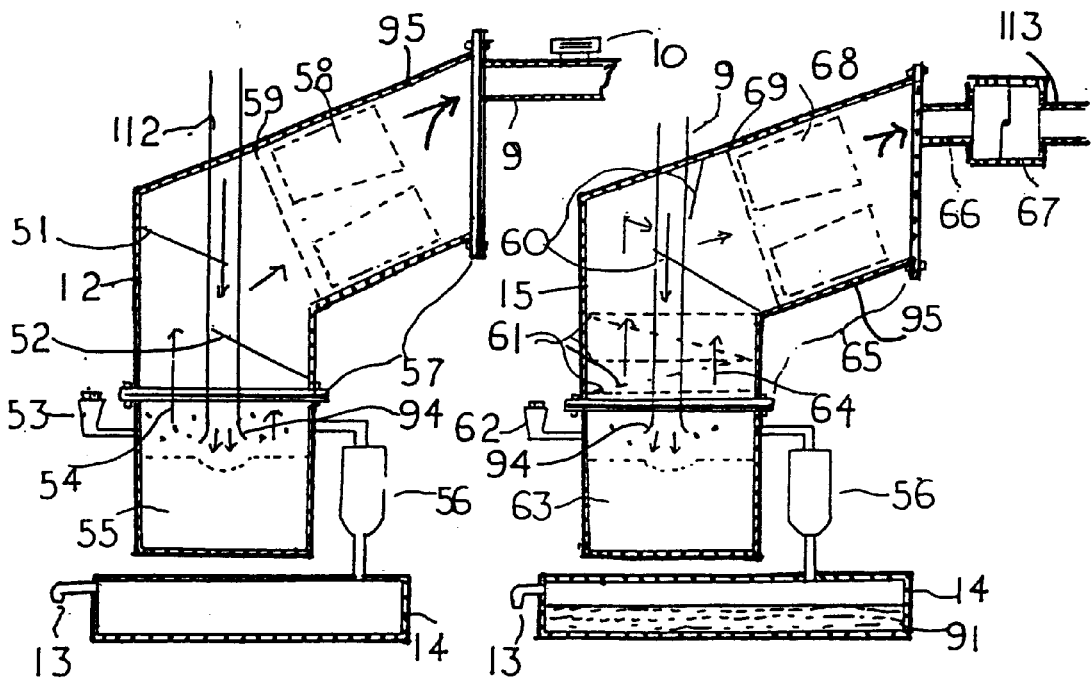

INTERNAL COMBUSTION ENGINE EXHAUST TREATING APPARATUS AND METHOD

FIELD OF THE INVENTION

This invention relates to the treatment of the exhaust gases from a diesel internal combustion engine to reduce the harmful emissions, particularly carbon deposits (soot), noxious odors, carbon dioxide, carbon monoxide, nitrogen oxides, sulfur oxides, from a diesel motor emissions gases.

DESCRIPTION OF DRAWINGS

Preferred embodiments of the invention as described below with reference to the accompanying drawings in which:

FIG. 6 is a section through a first chemical reactor a fluid separator and a fluid holding tank of an apparatus according to the present invention;

FIG. 7 is a section through a second chemical reactor, a chemical gases separator and fluid neutralizing holding tank with a an electronic damper according to the present invention, FIG. 8 is a schematic view of an alternate embodiment of the present invention;

BACKGROUND OF THE INVENTION

The combustion of diesel fuel in internal combustion engines usually depicts the reaction of air and the hydrocarbon contained in the fuel. Air chiefly comprises of nitrogen and oxygen gases which produces oxides of nitrogen, carbon and unburned hydrocarbon, the latter being mostly matter which contributes to smog. In general fuels generally contain sulfur, oxides of sulfur in combustion chambers and a large amount of unburned hydrocarbons which will be considered as particulate.

The oxides of carbon are carbon monoxide and carbon dioxide. Carbon monoxide is an unwanted gas as it is very poisonous; and carbon dioxide is also unwanted as it is a contributor to "greenhouse gases" which is thought to be a primary contributor to global warming.

Conventional diesel exhausts have a device which is known as a catalytic converter which reduces the amount of nitrogen oxides, and unburned hydrocarbons and carbon monoxide but tends to increase the emission of carbon dioxide and particulate which it does not reduce.

The object of this invention is to provide an apparatus and method for treating diesel internal combustion engines exhaust to significantly reduce the particulate carbon dioxide, nitrous oxide and sulfur oxides emitted to the atmosphere.

It is also another object of this invention to provide a method and apparatus to neutralize acid contained in the exhaust gases.

It is also an object of this invention to provide an apparatus which removes particulate (soot) and particulate matter (smog) from the exhaust gases.

It is the object of this invention to provide an apparatus as part of a diesel powered motor (i.e., heavy equipment, trucks, tractors, buses and any diesel powered equipment), as its exhaust system.

DESCRIPTION OF PREFERRED EMBODIMENTS

Figure 1:
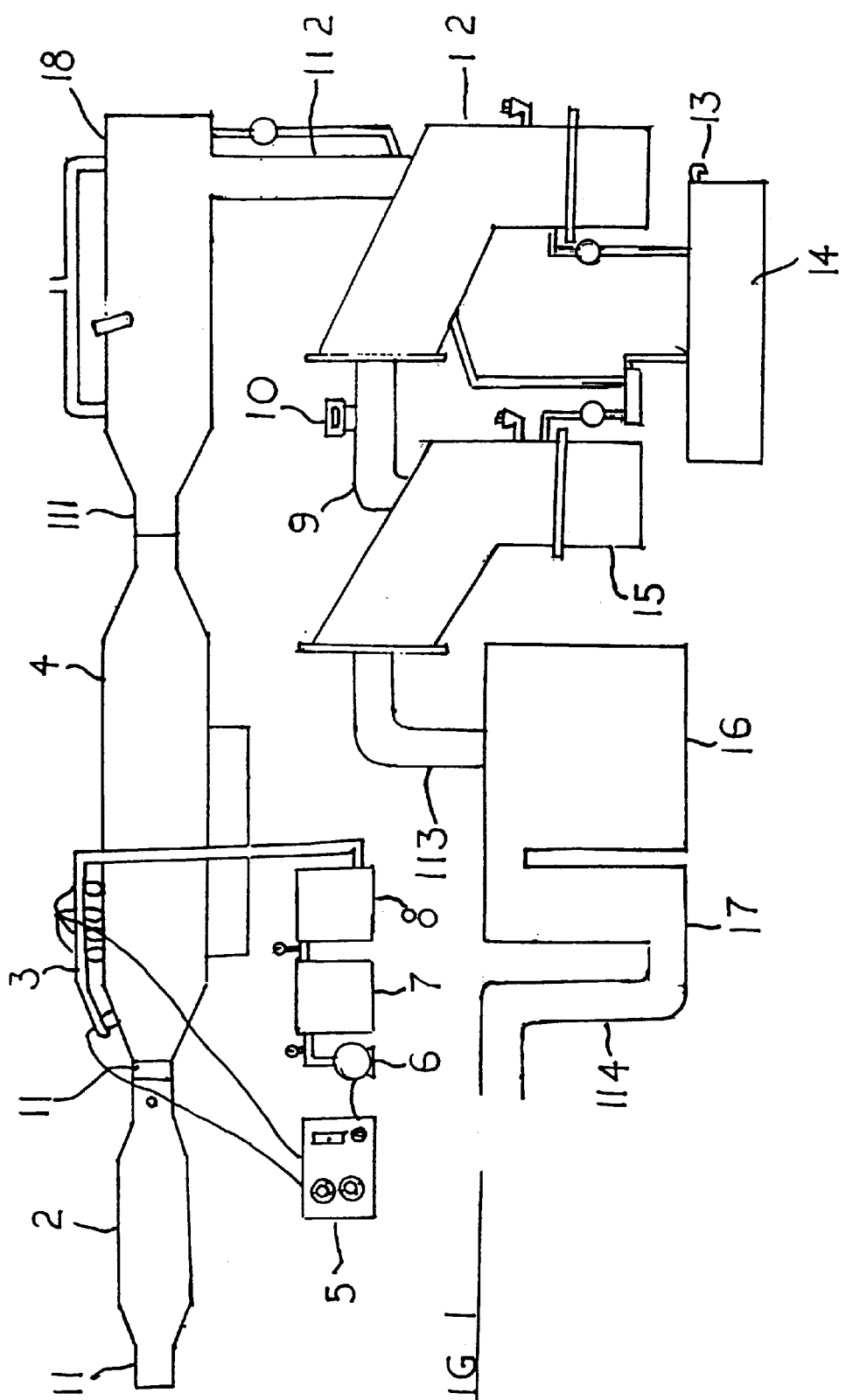
FIG. 1 is a schematic representation of a diesel combustion engine exhaust treating apparatus according to the present invention.

An apparatus according to the present invention for removing waste materials from a diesel fueled internal combustion engine exhaust as indicated in FIG. 1.

The apparatus in FIG. 1 has a soot separator 4, which is connected through an inlet 11 with a diesel exhaust system and is connected after the catalytic converter 2. The soot separator removes the soot by a chemical RP Super Filter Coat #421 injected through injectors for a specified period (seconds) over a set time (minutes). The soot collected then falls into the reservoir for the soot particles the exhaust with a major part of the soot particulate removed exits the separator 4 through an inlet 111, and enters into the heat exchanger 18. The heat exchanger 18 cools the incoming exhaust gases, resulting in condensation of a portion of the gases into a liquid condensate. The condensate will principally be water which is typically formed as a product in the combustion of hydrocarbon fuels. As oxides of nitrogen and sulfur are present in the combustion products these will combine with the condensed water vapor to form nitrogen and sulfur oxide, bases acids, including nitric and sulfuric acids.

The cooled gases and condensate exit the heat exchanger 18 through outlet 112 which fluidly communicates into a fluid separator 12. The fluid separator 12 separates the condensate from the non-condensed gases. Condensate collects in the bottom of the fluid separator 12 from where it drains into a holding tank 14. The condensate is neutralized by coming into contact with a neutralizing agent in the first chemical reactor which may form part of the first fluid separator 12 or the holding tank 14. A drain 13 Is provided for draining or overflowing neutralized condensate from the holding tank 14.

Non-condensed gases pass from the fluid separator 12 into a second chemical reactor 15 through a fluid conduit 9 which provides fluid communication between the separator 12 and the second chemical reactor 15.

An air inlet 10 is provided into the fluid conduit 9 to admit air into the apparatus in the event that a below ambient pressure should occur in the apparatus. It has been found that sudden acceleration or deceleration of the vehicle to which the apparatus FIG. 1 is attached may give rise to sudden pressure drops within the apparatus which results in a partial vacuum causing air inlet 10 to open.

The second chemical reactor 15 receives non-condensed gases from the fluid separator 12 which will contain carbon monoxide, carbon dioxide and resulting from the combustion of the diesel hydrocarbon fuels and possibly also from the neutralization reaction in the first chemical reactor from the neutralizing agent.

Treated exhaust gases may be passed from the second reactor 15 into a final scrubber 16 and 17, if one is provided through a fluid conduit 113 which provides fluid communication there between. The final scrubber 16 contains RP Super Filter Coat #421 which absorbs the minute particles of particulate (soot) in the treated exhaust gases, and the bath 17 removes any vapors from the reaction in the scrubber 16.

Depending on the quality of the diesel exhaust efficiency is required, the final scrubber 16 and vapor remover 17 may not be necessary.

The treated and scrubbed exhaust gases pass out of the final scrubber 16 and vapor remover 17 and are the vented into the atmosphere through an exhaust outlet 50 which may be used to cool the diesel engine when an air cooled engine is used.

The various components of the overall apparatus will now be described in more detail.

Figure 2:
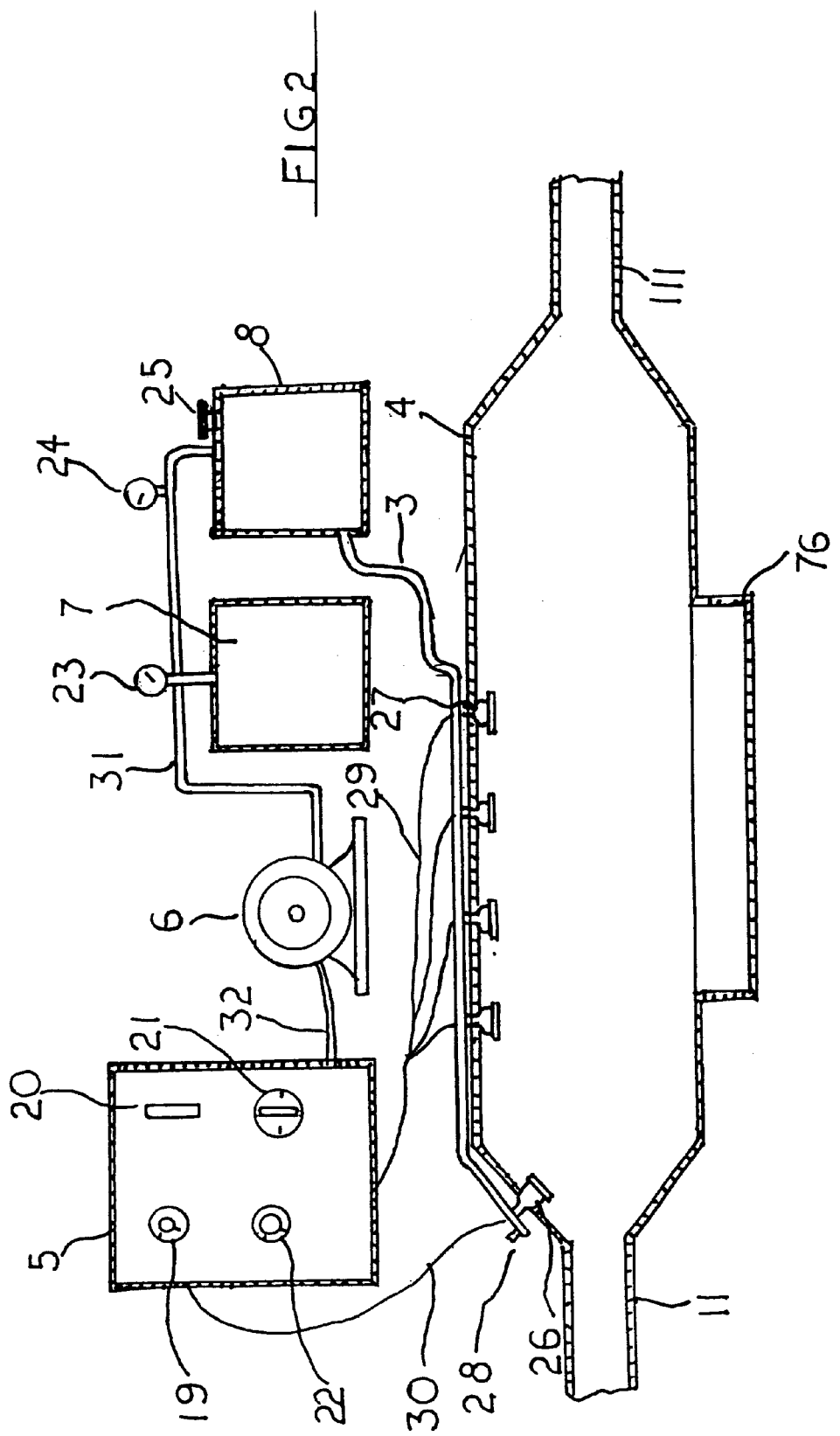
FIG. 2 is a schematic representation of a unit for the function of removing soot particles and odor from a diesel engine according to the present invention.

FIG. 2 illustrates the soot separator 4 which is connected to the diesel engine by the inlet 11 from the catalytic converter 2. The soot collector 4 is designed is shown externally by FIG. 2 and internally by FIG. 9. The soot separator 4 should reduce a major portion of the soot particulate from the exhaust by injecting a glue like chemical through injectors 26 and 29 from a chemical tank 8 through a carrier pipe 3. The chemical tank 3 is supplied by air pressure from a tank 7 which flows through 31 from 6 which is a small air compressor 23 and 24 respectively are pressure gauges to control the air pressure. 25 is the filler cap through which the chemical is placed in the chemical tank #8. A panel 5 is set up for the control units 19 including a time delay switch which control injectors 29. Fuses are contained in unit 20. The main switch for the power will be 21. An accelerator timer switch is used for injector 26 which controls the sudden acceleration of the diesel engine and picks up the soot particulate (soot) as it enters the soot separator. 32 is the power line from the panel to 6 the compressor. 30 is the lead wire from the panel to the accelerator injector 26. At the end of the feed pipe 3 is a manual release valve 28.

Figure 9:
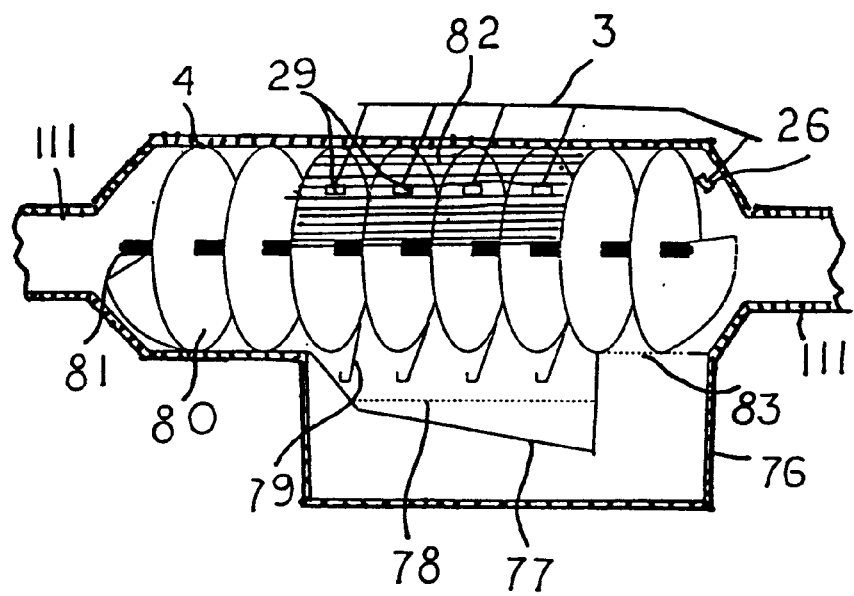
FIG. 9 is a schematic view of the internal features of a unit for the function of removing soot particles and odor from a diesel engine according to the present invention.

The particulate reservoir 76 is at the base of the soot separator 4. FIG. 9 shows a section through the soot separator 4.

The components of the soot separator 4 exposed to exhaust gases are preferably manufactured from a heat and corrosion resistant material such as stainless steel. The soot separator 12 has shell casing containing an auger 80 of specified dimension for proper adaptation to the diesel units. The chemical feed pipe 3 feeds the chemical to the injectors 29 which are directed at 82 a stainless steel mesh ⅛ openings which are inserted into the auger blades 80. The centre of the auger is sealed onto a pipe 81 which runs the full length of the auger. The entrance of the exhaust 11 has at the immediate entry an accelerator injector 26 which is fed from the feed pipe 3. A perforated plate 78 may be set into the catch basin of which 77 is the bottom plate that has larger holes to accommodate the collected particulate which will be deposited into 76 the reservoir. The exhaust is returned back up into the auger by 79 deflectors attached to the bottom of the auger blades and are hooked at the base to deflect the air. The shell of the soot separator should have small perforations 83 so that any particulate from the injector 26 may be collected and as the exhaust is cleaned it exits through 11.

Figure 3:
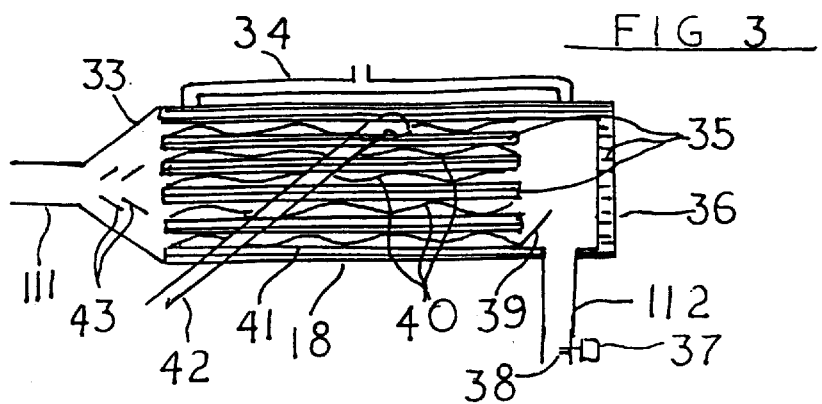
FIG. 3, 4 and 5 are schematics of the internal features of a heat exchanger according to the present invention.

FIG. 3 shows a cross section through the heat exchanger 18. The components of the heat exchanger exposed to exhaust gases are preferably manufactured from a heat and corrosion resistant material such as stainless steel. The heat exchanger 18 has a shell or casing containing a coolant chamber 35.

The coolant chamber 35 fluidly intercommunicates with a coolant inlet 34, and a coolant outlet 42 so that the coolant fluid entering the coolant inlets 34 will pass through the coolant chamber 35 to emerge from the coolant outlet 42.

The coolant chamber 35 extends around the exhaust tubes 41 which receive hot exhaust gases from the inlet. 111 which is received by a cone shaped, receives 33 which contains 43 two cone shaped baffles which deflect the gases evenly in the heat exchanger 12 entering the exhaust tubes 41. Heat from the exhaust entering the inlet 33 is transmitted through the exhaust tubes 41 into the coolant fluid contained within the coolant chamber 36. The total cross-sectional area of the exhaust tubes should be adequate to minimize flow restrictions through and attendant back pressure associated with the heat exchanger 18.

Spiral baffles 40 may be provided in the exhaust tubes 41 to promote swirling of the exhaust passing through the tubes and to conduct heat from the exhaust gases into the coolant chamber 35 thereby promoting heat transfer and enhancing the efficiency of the heat exchanger 18.

Figure 4:
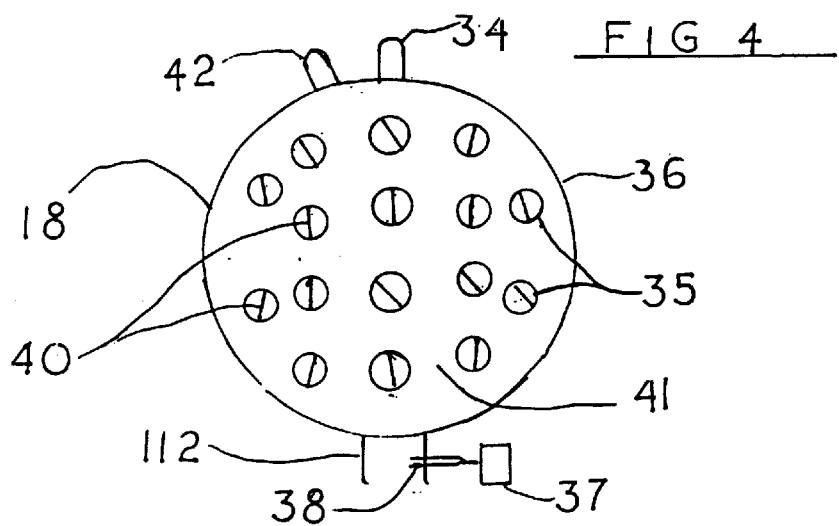

FIG. 4 is also a cross-section of the heat exchanger 18 which shows the exhaust outlet 112 containing the heat probe 37 on the exterior of the outlet 112 with an interior sensor probe inside of the outlet 112.

Figure 5:
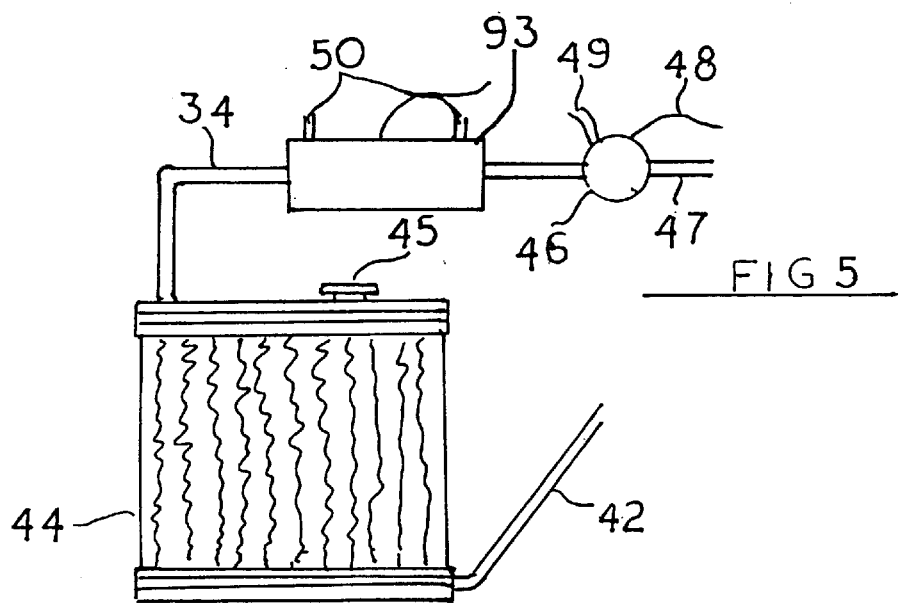

FIG. 2 illustrates the connection for the purpose of the cooling of the heat exchanger 18 to a cooling system as illustrated in FIG. 5. Preferably the heat exchanger 18 should reduce the exhaust temperature to a temperature of about 5° or 10° C. (approximately 40° to 50° F.). In cold weather this can be accomplished by connecting coolant inlet 47 and coolant outlet 42 of the heat exchanger 18 to a radiator 44 which will be set up specifically for the operation of this apparatus.

As the radiator 44 cannot cool coolant below ambient temperature, a further source of cooling is required in warm weather. This can be provided by the addition of an air conditioning cooling pump to the diesel engine. Reference 93 indicates an evaporator coil in a cooling compressor for cooling coolant flowing through a cooling conduit 47 providing fluid communication between the coolant into the heat exchanger and the radiator 44.

A coolant pump 46 is provided in the cooling conduit 47. The operator of the coolant pump 46 is controlled by a control system 37. FIG. 4 which monitors the temperature by a probe 38 which monitors the temperature of the gas/condensate exiting outlet 112 of the heat exchanger 18. Depending on the nature of the specific control system 37 and pump 93 selected the control system can either vary pump speed or simply urn the pumps on and off as required to maintain the temperature of the gas/condensate exiting the outlet 112 within the desired range. A temperature sensor 38, FIG. 4, may be mounted at a suitable location such as, for example adjacent to outlet 112 to provide a temperature indicating signal to the control system 37.

FIG. 6 shows a cross-section through of the fluid separator 12. Condensate/gas emanating from the outlet 112 of the heat exchanger 18 is directed into the bottom of the fluid separator 12 from the inlet 112 by a funnel shaped inlet guide 94. A block of a suitable neutralizing agent such as sodium carbonate (soda ash) 55 is located at the bottom of the fluid separator 12 in the stream of the condensate/gas emanating from the inlet guide 94. The soda ash block 55 reacts with the acidic concentrate to neutralize acids contained in the condensate. The neutralized condensate flows through a fluid conduit into a one way drain valve 56 which is provided to prevent the return of the neutralized condensate from the holding tank 14 into the fluid separator 12.

The condensate may be periodically drained from the holding tank 14 through a drain 13 or left to overflow. A valve is provided to open and close the drain 13.

Although the soda ash block 55 is shown in the fluid separator, alternatively, or additionally, soda ash may be provided into the holding tank 14. The placement of the soda ash in association with the fluid separator 12 and/or the holding tank 14 provides a first chemical reactor for neutralizing acids in the condensate.

Non-condensed gases pass upwardly in the direction of arrows 54 into a branch 95 of the fluid separator towards an outlet 9. Baffles 51 and 52 are provided in the gas flow path to trap condensate carried in the gas. As the velocity of the exhaust diminishes and as it changes direction through the fluid separator, particulate matter tends to separate from the exhaust in the fluid separator and settle out with the condensate.

A further specially designed soda ash block 58 may be provided in the branch 96 as part of the first chemical reactor to react with any condensate carried by the exhaust gas flow into the branch 96. A stainless steel mesh screen 59 is provided across the branch 96 to prevent the soda ash block 59 from falling into the bottom of the separator 12. The soda ash block 55 will be activated by 5 to 8oz of water poured through an intake funnel 54. All soda ash blocks 55 and 58 contain time released pellets or time released layers of soda ash to reconstitute the chemical.

Flanges 57 are provided in the fluid separator 12 to allow disassembly for replacement of the soda ash blocks 55 and 58 respectively.

Treated gas exits the branch 95 of the separator through the fluid conduit 9 into a second chemical reactor 15 such as shown in a detailed sectional view in FIG. 7. The structure of the second reactor is very similar outwardly to the first reactor. This reactor may be made from non-corrosive steel as is the first reactor 12 for protection purposes and the interior of the unit 15 may be coated with a urethane or other suitable coating which is resistant to the caustic materials such as potassium hydroxide.

The exhaust gas is directed through the fluid conduit 9 down into the bottom of the second separator 15. The fluid conduit 9 has a funnel shaped bottom 94. A designed block of potassium hydroxide (containing time release pellets or time release layers of potassium hydroxide to reconstitute the chemical) 63 is located at the bottom of the reactor 16 in the stream of the gas emanating from the inlet guide (4 to 8oz of water must be added through 62 to activate the potassium hydroxide). The potassium hydroxide reacts with the carbon monoxide, carbon dioxide and nitrogen oxide which are absorbed into the activated hydroxide. As the gas is forced down through the second fluid conduit 9 onto the potassium hydroxide 63, it will deposit whatever vapor remaining and it is absorbed into the potassium hydroxide 63. As the vapor is deposited into the reactor 15 an automatic overflow 56 allows the extra hydroxide condensate to leave and be deposited into the holding tank 14 which contains a small amount of mild acid 91 to neutralize the caustic effect of the potassium hydroxide 63. A drain 13 is supplied to drain the tank 14 occasionally.

The exhaust less a major portion of the carbon dioxide, carbon monoxide and nitrogen oxide plus other contaminants passed upwardly in the direction of arrows 64 into the branch 95 of the reactor towards an outlet and into a fluid conduit 66. Three to six baffles 61 are set horizontally and/or on an angle between the horizontal baffles, across the second reactor 15 each having holes with a smaller size beginning at the lower baffles with the holes being enlarged as you rise. Typical holes would be $\frac{1}{8}$", $\frac{3}{16}$" and $\frac{1}{4}$". The baffles slow the exhaust speed and prevent an upward motion of any of the potassium hydroxide contaminating fluid. The gases then enter a branch where two more solid baffles 60 are situated for further impeding the speed of the exhaust and any vapors present. A stainless steel wire mesh 69 supports a specially designed potassium hydroxide block 68 with the same properties of the one at the bottom of the reactor.

The upper potassium hydroxide block 68 will pick up any further deposits of carbon dioxide, carbon monoxide, nitrogen oxide, and any other contaminants remaining and the exhaust through the exit pipe 66 into an electronic shutter 67 controlled from the ignition lay to prevent contaminated gases from entering the system while not in use, thence the exhaust is released into the atmosphere.

Two second chemical reactors are illustrated and described but it should be appreciated that the actual numbers may be increased by a particular application.

FIG. 8 illustrates an altered embodiment similar to that described above but in which the first and second chemical reactors 12 and 15 respectively share a common holding tank.

Neutralized condensate from the first reactor 12 drains through an automatic drain 56 into the holding tank 14. In the embodiment described above it was noted that condensate from the second chemical reactor 15 will typically be alkaline and therefore the holding tank 14 associated with the second reactor 15 contains a mild acid 91. In the embodiment illustrated in FIG. 7 the second chemical reactor 15 drains through an automatic drain 56 and a first drain conduit 73 into a first chamber 74 in which it is neutralized prior to draining through a second drain conduit 75 into the holding tank 14.

The first chamber 74 fluidly communicates with the heat exchanger 18 through a pipe 72. The heat exchanger 18 will typically contain acidic condensate 96 which may be collected at 70 and 71 and drained through an automatic drain 56 and pipe 72 into the first chamber 74. The acidic concentrate 96 from the heat exchanger 18 reacts with the alkaline condensate from the second chemical reactor 15 to form a neutralized solution which drains into the holding tank 14 through a pipe 74 which provides fluid communication between the first chamber 74 and the holding tank 14.

Figure 10:
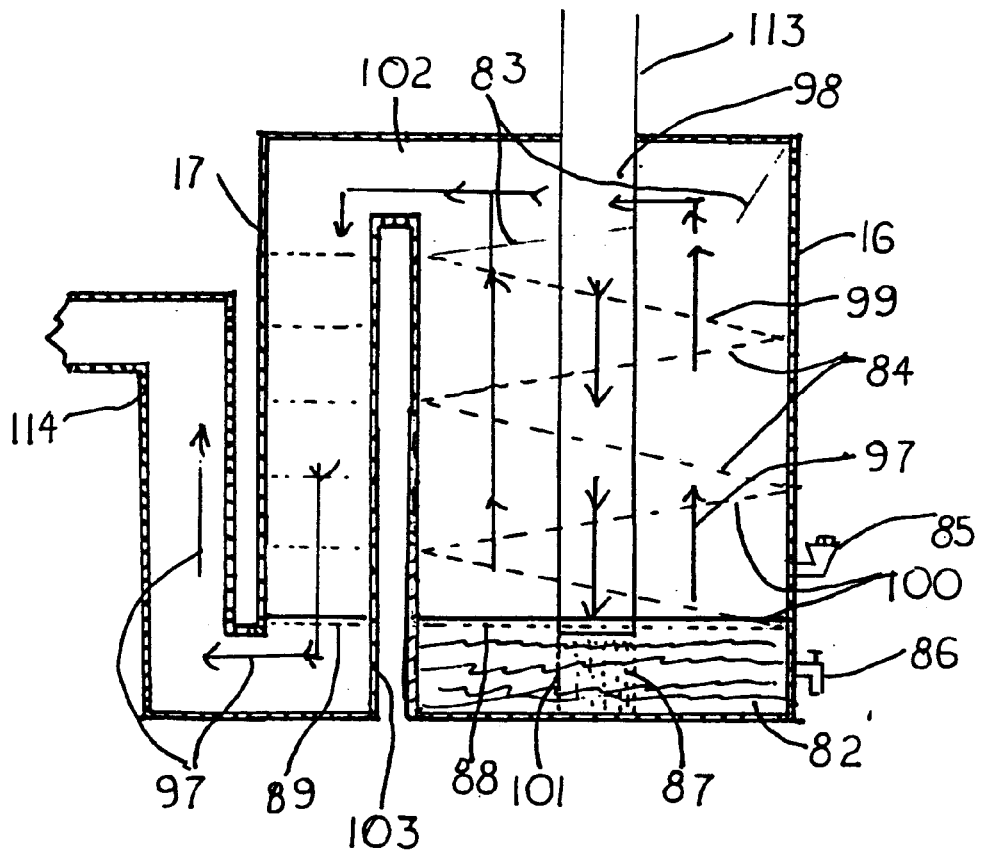
FIG. 10 is a schematic view of the internal features of an optional soot bath for the function of removing minute particles from the exhaust and final removal of vapor according to the present invention.

FIG. 10 depicts a cross-section of 16 a chemical bath for removal of minute exhaust gases.

The inlet pipe 98 is perforated at it's lowermost end 87 by a plurality of small holes 87 to radically disperse the exhaust gases into a liquid 82 surrounding the pipe (RP Super Filter Coat #421). This chemical liquid would be used for the removal of minute particles of soot remaining in the exhaust The holes 87 extend at the end of the pipe 101, a distance corresponding to approximately the outside diameter of the inlet pipe 98 and the total area of the holes 87 should be approximately twice the cross-sectioned area of the inside of the inlet pipe to minimize flow restrictions. The actual size and number of holes may vary somewhat in practice with the overall object being to provide enough holes to minimize flow restrictions with small enough holes to provide good dispersion of gas into the liquid 82 within the bath 16, without tending to force the liquid 82 out of the bath 16. Typically the holes may be on the order of $\frac{3}{32}$ (approximately 2 mm in diameter).

A series of inclined baffles 8, 99 and 100 extend across the bath 16, one above the other in a zig zag configuration except for the baffle plate 88 which is generally horizontally disposed. The inlet pipe 98 may extend down through the centre of the baffle plates 84 through 100.

The level of the 82 should be between the uppermost of the holes 87 and the underside of baffle plate 88.

The baffle plates 84 (two) 99 and 100 (two) are perforated to allow the upward passage of the exhaust baffles through the bath 16. Typically the number of holes would be greater and their respective sizes smaller the closer the respective of the baffle 100, 84 and 99, into the bottom of the first stage.

The overall area of the holes in each baffle should be at least 1 ¾ times across the sectional area of the inside of the pipe 87 to minimize flow restriction. The typical hole size may be 88–³⁄₃₂" (approximately 2 mm), 100–⅛" (approximately 2 mm) each, 84–⅜" (approximately 2 mm) each, and 99–⅜" (approximately 2 mm).

The upper baffles 83 are not perforated and extend from the wall of 16 and about half of the area of 16 leaving a gap for the gases may flow. The gap should have an area of at least 1 ¾ times the cross-sectional area of the inside of the pipe 98 to minimize flow restrictions. Chemicals are inserted through 86 and when it is necessary to change the chemical (82 a tap 86 is provided).

The exhaust then enters a further drying area 17 when the exhaust enters 102 into a down pipe containing a number of perforated baffles 89 that have ½" (approximately 2 mm) holes in each of the six baffles with enough area to minimize flow restrictions. The exhaust direction 97 then exits through 114 into the atmosphere or returned as a coolant for air cooled engines as the exhaust air will be clean and cool.

Figure 11:
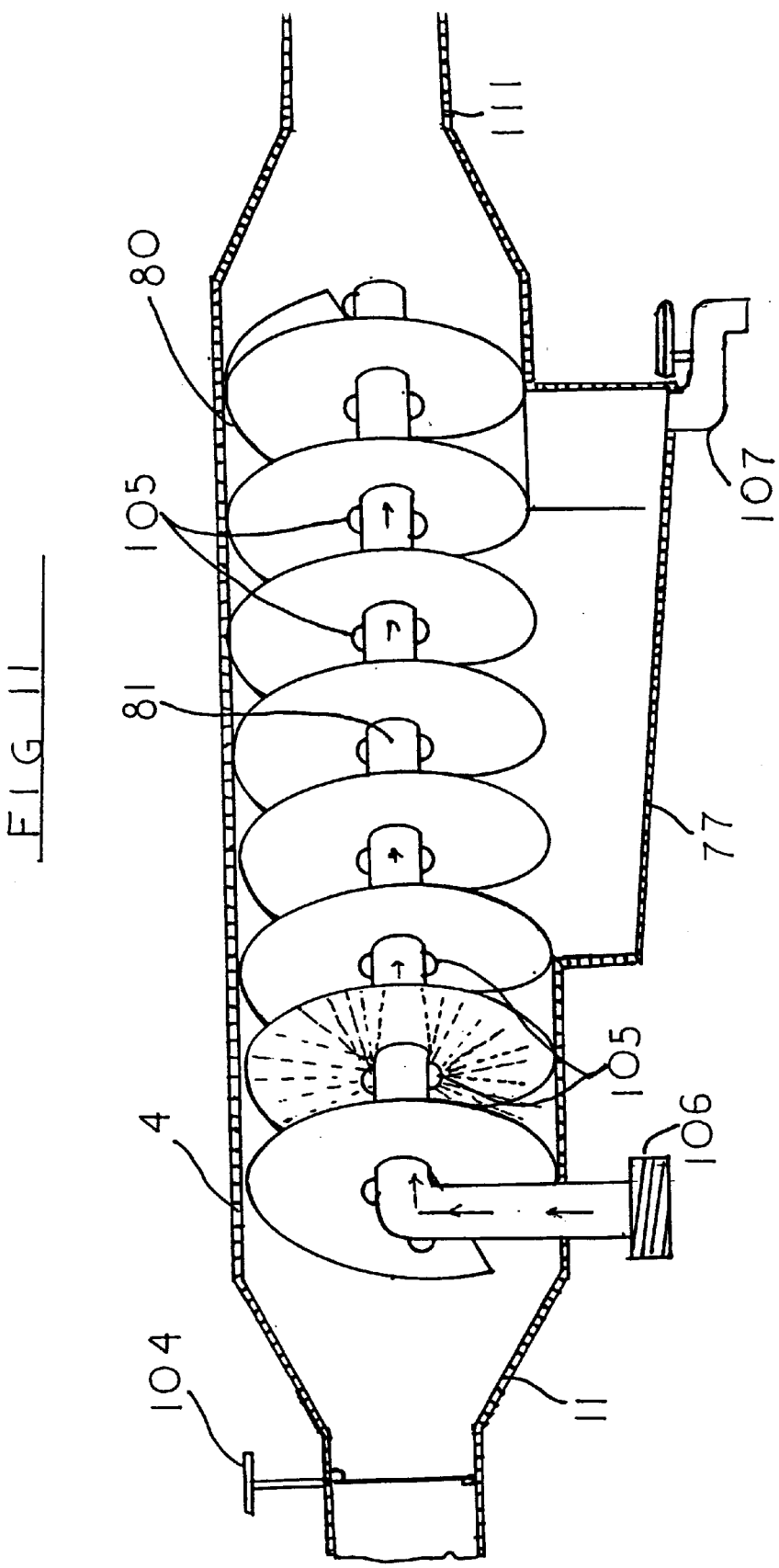
FIG. 11 is a cross-section view of the internal features of an optional hot water cleansing system for the interior of the soot separator for removing all leftover chemical and particulate as the chemical is water soluble.

FIG. 11 is the interior section f FIG. 9 which removes soot particulate from the exhaust. This is an optional unit designed for the purpose of cleaning the inlet of the soot remover 4 by connecting 106 to a hot or cold water outlet thence the water enters into the centre pipe 81 which will have small spray nozzles 105 in each section of the auger 80 by closing the valve 104 in the exit pipe 11 the water flow is restricted into the chamber. The particulate will then be carried down into the collector area 77 thence out into to a deposit area through a tap 107 provided for same.

A catalytic converter or scrubber can be incorporated into the connecting pipe # III between the condenser 4 and the soot separator 18 for the purpose of the removal of hydrocarbons that may be produced by the chemical Super Filter Coat used for the separation of the soot particles in the exhaust.

What is claimed is:

1. apparatus for removing diesel particulate and gases from a diesel internal combustion exhaust and apparatus comprising of:
    a soot separator attached to a catalytic converter of a diesel exhaust system for receiving and removing particulate from the exhaust, whereas the soot separator removes particulate (soot) by a specially injected chemical (RP Super Filter Coat 421) into a chamber to which the particulate will enter and be contained in a reservoir;
    a heat exchanger attached to the soot separator (attached to a diesel exhaust system) for receiving and cooling exhaust passing there through and condensing at least a portion of the exhaust into a liquid condensate;
    a first chemical reactor fluidly communicating with said heat exchanger for receiving and removing the condensate and draining into a holding tank associated therewith, the first chemical reactor exposing the condensate to a neutralizing agent contained therein to neutralize acids in the condensate;
    at least one second chemical reactor fluidly communicating with said first chemical reactor for receiving non-condensed gases from said first chemical reactor and reacting carbon monoxide, carbon dioxide, and nitrogen oxide contained in a non-condensed gases with a substance contained in said second chemical reactor which absorbs carbon monoxide, carbon dioxide, and nitrogen acids and removes at least some of said particulate matter from the non-condensed gases and discharges a balance of said exhaust through an outlet, wherein said second chemical reactor drains into a first chamber fluidly communicating therewith;
    a first drain conduit is connected to said heat exchanger and said first chamber to provide fluid communication there between for a portion of said liquid condensate formed in said heat exchanger; and
    said first chamber fluidly communicate with said holding tank through a second drain conduit extending there between.

2. An apparatus as claimed in claim 1, wherein said heat exchanger is connected to receive coolant from a separate radiator and from a cooling compressor evaporator attached to the diesel engine to which said apparatus is attached.

3. An apparatus for removing diesel particulate and gases from a diesel internal combustion exhaust and apparatus comprising of:
    a soot separator attached to a catalytic converter of a diesel exhaust system for receiving and removing particulate from the exhaust;
    a heat exchanger attached to the soot separator (attached to a diesel exhaust system) for receiving and cooling exhaust passing there through and condensing at least a portion of the exhaust into a liquid condensate, wherein said heat exchanger cools the exhaust to a temperature from approximately 5 to 10° C. (40–50° F.);
    first chemical reactor fluidly communicating with said heat exchanger for receiving and removing the condensate and draining into a holding tank associated therewith, the first chemical reactor exposing the condensate to a neutralizing agent contained therein to neutralize acids in the condensate, said neutralizing agent in said first chemical reactor is a sodium carbonate (soda ash);
    at least one second chemical reactor fluidly communicating with said first chemical reactor for receiving non-condensed gases from said first chemical reactor and reacting carbon monoxide, carbon dioxide, and nitrogen oxide contained in a non-condensed gases with a substance contained in said second chemical reactor which absorbs carbon monoxide, carbon dioxide, and nitrogen acids and removes at least some of said particulate matter from the non-condensed gases and discharges a balance of said exhaust through an outlet, said substance in said second chemical reactor is an alkali metal hydroxide in solid form, wherein said second chemical reactor drains into a first chamber fluidly communicating herewith;
    a first drain conduit is connected to a said heat exchanger and said first chamber to provide fluid communication there between for a portion of said liquid condensate formed in said heat exchanger; and
    said first chamber fluidly communicates with said holding tank through a second drain conduit extending there between.

4. An apparatus as claimed in claim 1, wherein said heat exchanger is connected to receive coolant from a separate radiator and from a cooling compressor evaporator attached to the diesel engine to which said apparatus is attached.

* * * * *